(12) United States Patent
Lyle et al.

(10) Patent No.: US 9,219,765 B2
(45) Date of Patent: Dec. 22, 2015

(54) END USER QOS SELECTION

(75) Inventors: Ruthie D. Lyle, Durham, NC (US);
Patrick Joseph O'Sullivan, Ballsbridge (IE); Fred Raguillat, Dunboyne (IE); Carol Sue Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 490 days.

(21) Appl. No.: 13/468,369

(22) Filed: May 10, 2012

(65) Prior Publication Data
US 2013/0304848 A1    Nov. 14, 2013

(51) Int. Cl.
G06F 15/16    (2006.01)
H04L 29/06    (2006.01)

(52) U.S. Cl.
CPC ............ H04L 65/1089 (2013.01); H04L 65/80 (2013.01)

(58) Field of Classification Search
None
See application file for complete search history.

(56) References Cited

U.S. PATENT DOCUMENTS

| | | |
|---|---|---|
| 7,778,326 B1 | 8/2010 | Chen et al. |
| 2007/0253445 A1* | 11/2007 | Lee .............................. 370/468 |
| 2008/0016185 A1 | 1/2008 | Herberger et al. |
| 2008/0262996 A1* | 10/2008 | Yogeshwar et al. ............... 707/1 |
| 2011/0116409 A1* | 5/2011 | Jeong et al. .................... 370/252 |
| 2013/0007263 A1* | 1/2013 | Soroushian et al. ........... 709/224 |

OTHER PUBLICATIONS

Chowdhury, et al., "Adaptive QoS Management for Collaboration in Heterogeneous Environments", Proceedings of the 16th International Parallel and Distributed Computing Symposium, 11th Heterogeneous Computing Workshop, Fort Lauderdale., ACM.

Sérgio Deusdado, QoS Adaptation in Multimedia Multicast Conference Applications for E-Learning Services, International Journal of Distance Education Technologies, Oct./Dec. 2006, IGI Publishing.

* cited by examiner

*Primary Examiner* — Lisa Lewis
*Assistant Examiner* — Henry Tsang
(74) *Attorney, Agent, or Firm* — Holland & Knight LLP; Brian J. Colandreo, Esq.; Jeffrey T. Placker, Esq.

(57) ABSTRACT

A method, computer program product, and computer system for receiving, at a remote computer device, a response time goal selected by an end user. The response time goal includes an interval when a next payload is to be received at a local computer device from the remote computer device. The remote computer device dynamically adjusts content of the next payload to be delivered to the local computer device based on the response time goal selected by the end user to allow the content of the next payload to be received at the local computer device within the response time goal selected by the end user.

21 Claims, 8 Drawing Sheets

END USER QOS SELECTION

TECHNICAL FIELD

This disclosure relates to end user QoS selection.

BACKGROUND

Advances in communication systems allow geographically dispersed participants to, for example, conduct online meetings (eMeetings). For example, the participants may use an eMeeting service to share content required for the meeting. Such content may include, for instance, slides, text documents, videos, graphics, drawings, or shared whiteboards. Participants likewise may engage in a conversation about the shared content over, e.g., a voice channel, such as a public telephone network.

Typically, all participants in the geographically dispersed eMeeting will not enjoy identical network bandwidth and network latency. As a result, a delay may be observed for some participants seeing the eMeeting content as they wait for content to render on their screen. The delays in waiting for all eMeeting participants to see the eMeeting content may break the cognitive flow of the eMeeting, thereby reducing the social collaboration achieved by the participants. This may be more prevalent, for example, with mobile participants who may be accessing eMeeting content while travelling, or via mobile devices such as smartphones, or via high latency/low speed connections. The bandwidth from these devices is often limited, and network congestion and periodically reduced bandwidth may lead to significant delays in rendering screen content for mobile eMeeting participants.

SUMMARY OF DISCLOSURE

In one implementation, a method for end user QoS selection, performed by one or more computing devices, comprises receiving, at a remote computer device, a response time goal selected by an end user. The response time goal includes an interval when a next payload is to be received at a local computer device from the remote computer device. The remote computer device dynamically adjusts content of the next payload to be delivered to the local computer device based on the response time goal selected by the end user to allow the content of the next payload to be received at the local computer device within the response time goal selected by the end user.

One or more of the following features may be included. Adjusting the content of the next payload may include adjusting quality of the content. Adjusting the content of the next payload may include filtering the content of the next payload. Adjusting the content of the next payload may include adjusting the content of the next payload to be delivered to a plurality of local computer devices based on the response time goal selected by the end user. Adjusting the content of the next payload may include adjusting the content of the next payload to be delivered to a plurality of local computer devices, wherein at least one response time goal of a second end user of the plurality of local computer devices may be different than the response time goal selected by the end user. One or more QoS characteristics of the local computer device may be polled to determine the adjustment of the content of the next payload to achieve the response time goal selected by the end user. A preview of the content of the next payload may be simulated based on the response time goal selected by the end user.

In another implementation, a computer program product resides on a computer readable storage medium that has a plurality of instructions stored on it. When executed by a processor, the instructions cause the processor to perform operations comprising receiving, at a remote computer device, a response time goal selected by an end user. The response time goal includes an interval when a next payload is to be received at a local computer device from the remote computer device. The remote computer device dynamically adjusts content of the next payload to be delivered to the local computer device based on the response time goal selected by the end user to allow the content of the next payload to be received at the local computer device within the response time goal selected by the end user.

One or more of the following features may be included. Adjusting the content of the next payload may include adjusting quality of the content. Adjusting the content of the next payload may include filtering the content of the next payload. Adjusting the content of the next payload may include adjusting the content of the next payload to be delivered to a plurality of local computer devices based on the response time goal selected by the end user. Adjusting the content of the next payload may include adjusting the content of the next payload to be delivered to a plurality of local computer devices, wherein at least one response time goal of a second end user of the plurality of local computer devices may be different than the response time goal selected by the end user. One or more QoS characteristics of the local computer device may be polled to determine the adjustment of the content of the next payload to achieve the response time goal selected by the end user. A preview of the content of the next payload may be simulated based on the response time goal selected by the end user.

In another implementation, a computing system includes a processor and memory configured to perform operations comprising receiving, at a remote computer device, a response time goal selected by an end user. The response time goal includes an interval when a next payload is to be received at a local computer device from the remote computer device. The remote computer device dynamically adjusts content of the next payload to be delivered to the local computer device based on the response time goal selected by the end user to allow the content of the next payload to be received at the local computer device within the response time goal selected by the end user.

One or more of the following features may be included. Adjusting the content of the next payload may include adjusting quality of the content. Adjusting the content of the next payload may include filtering the content of the next payload. Adjusting the content of the next payload may include adjusting the content of the next payload to be delivered to a plurality of local computer devices based on the response time goal selected by the end user. Adjusting the content of the next payload may include adjusting the content of the next payload to be delivered to a plurality of local computer devices, wherein at least one response time goal of a second end user of the plurality of local computer devices may be different than the response time goal selected by the end user. One or more QoS characteristics of the local computer device may be polled to determine the adjustment of the content of the next payload to achieve the response time goal selected by the end user. A preview of the content of the next payload may be simulated based on the response time goal selected by the end user.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE EMBODIMENTS

Figure 1:
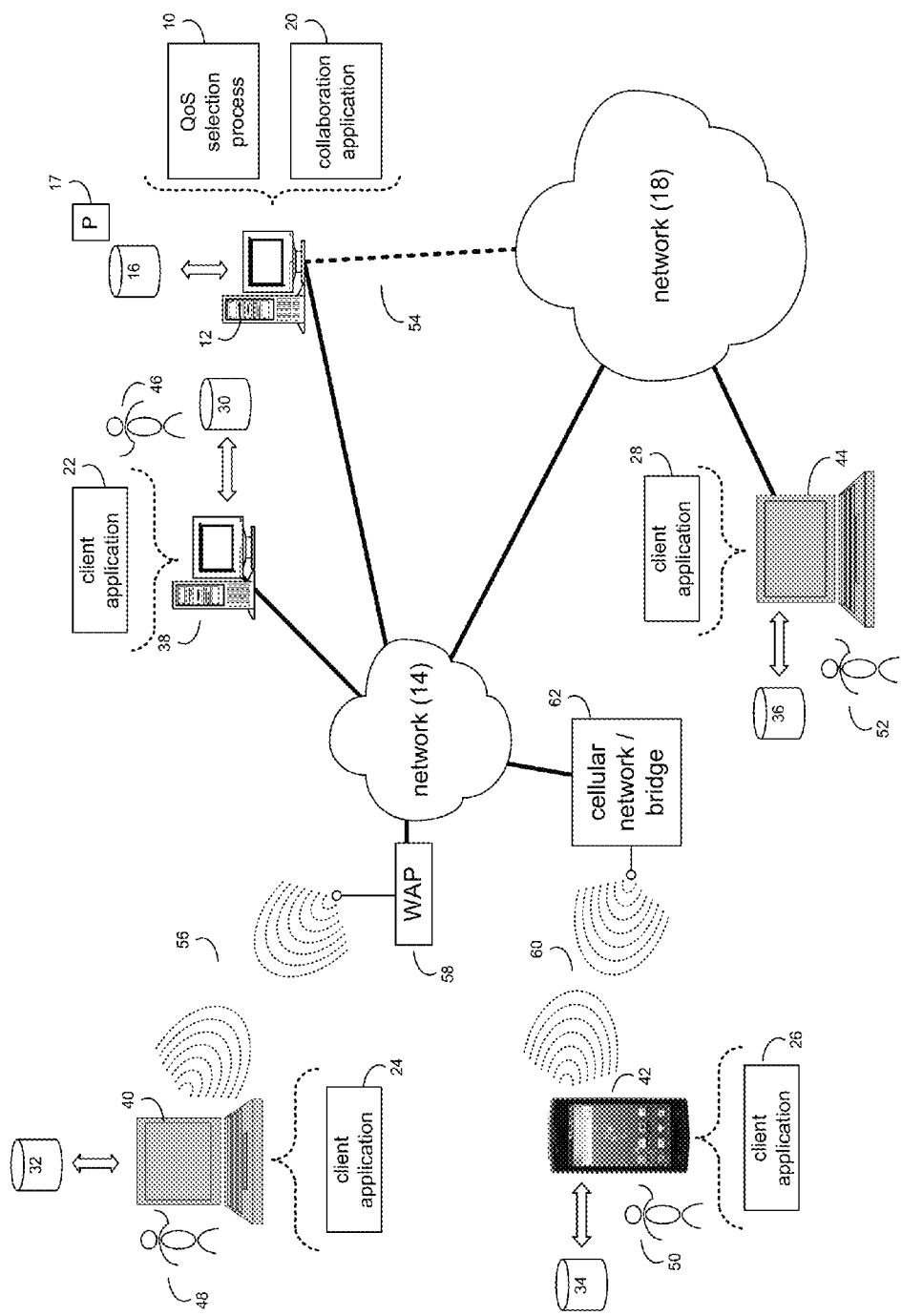
FIG. 1 is an illustrative diagrammatic view of a QoS selection process coupled to a distributed computing network.
Figure 2:
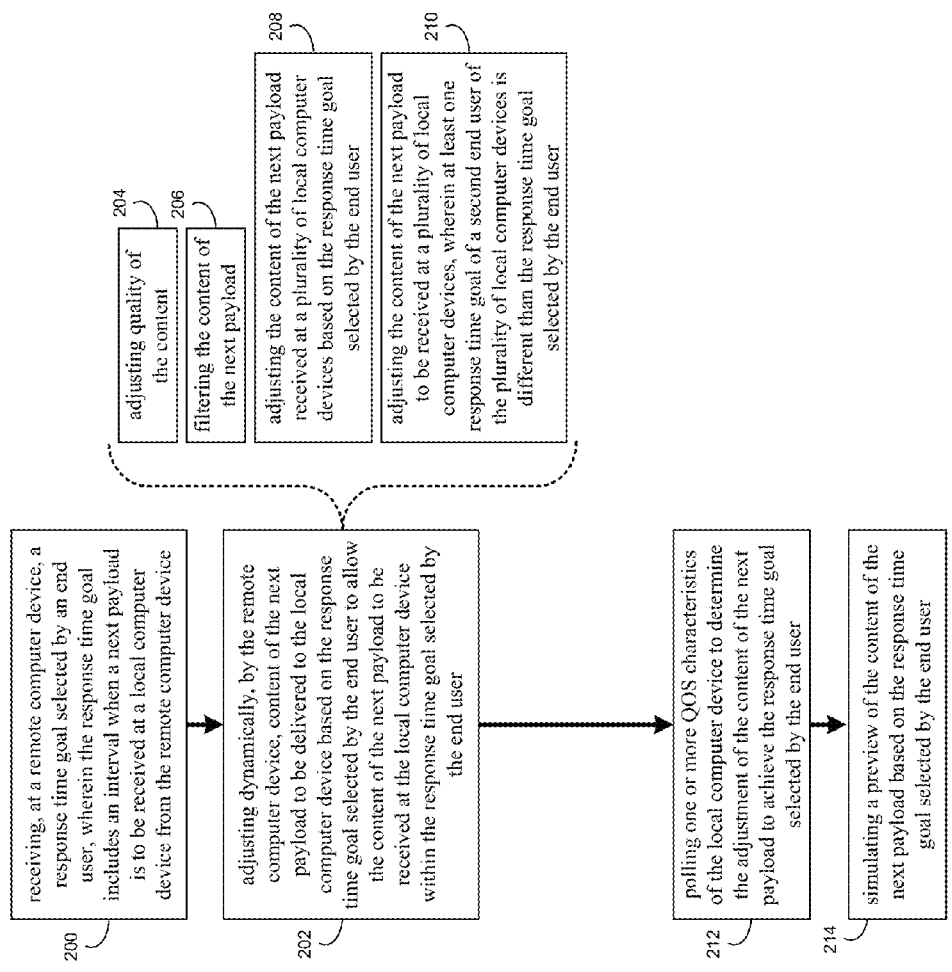
FIG. 2 is an illustrative flowchart of the QoS selection process of FIG. 1.
Figure 3:
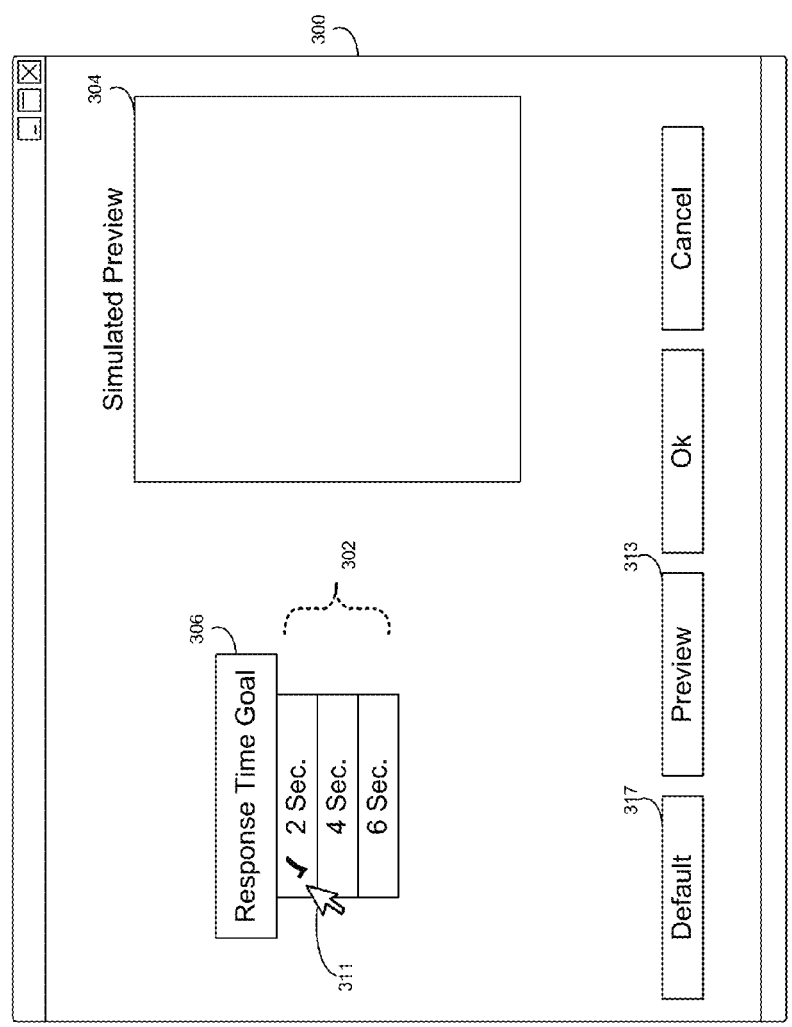
FIG. 3 is an illustrative diagrammatic view of a screen image displayed by the QoS selection process of FIG. 1.
Figure 4:
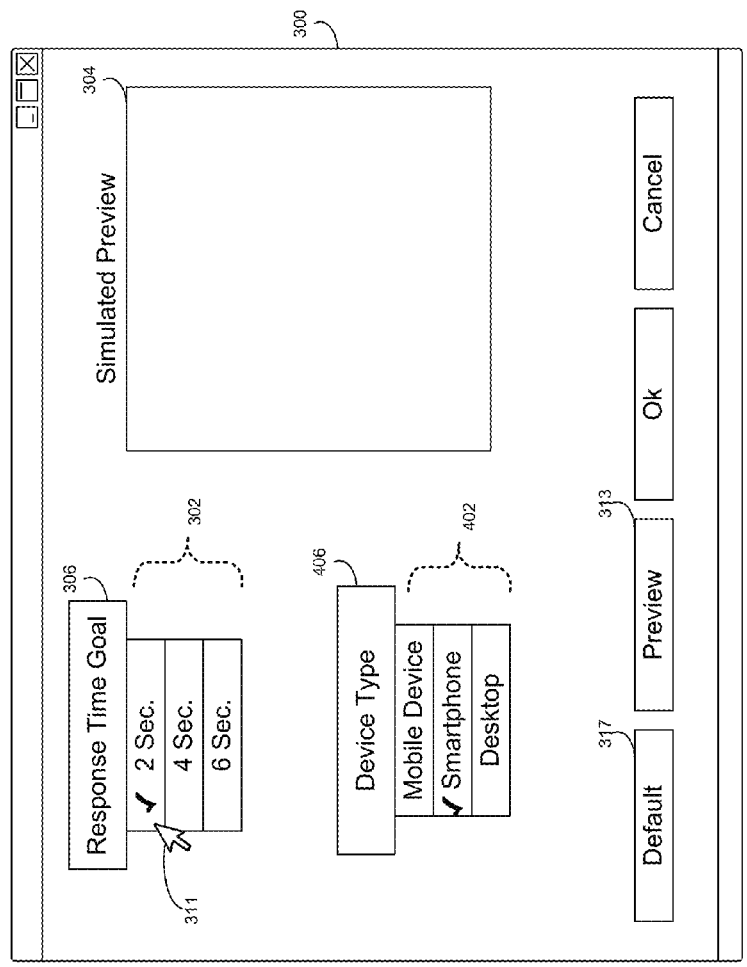
FIG. 4 is an illustrative diagrammatic view of a screen image displayed by the QoS selection process of FIG. 1.
Figure 5:
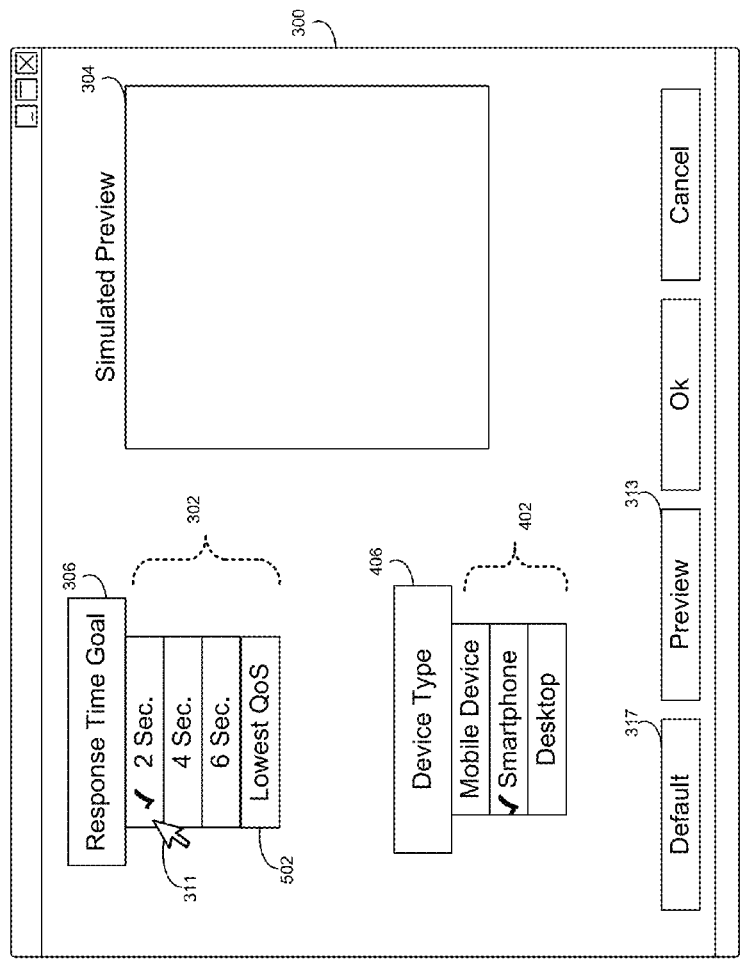
FIG. 5 is an illustrative diagrammatic view of a screen image displayed by the QoS selection process of FIG. 1.
Figure 6:
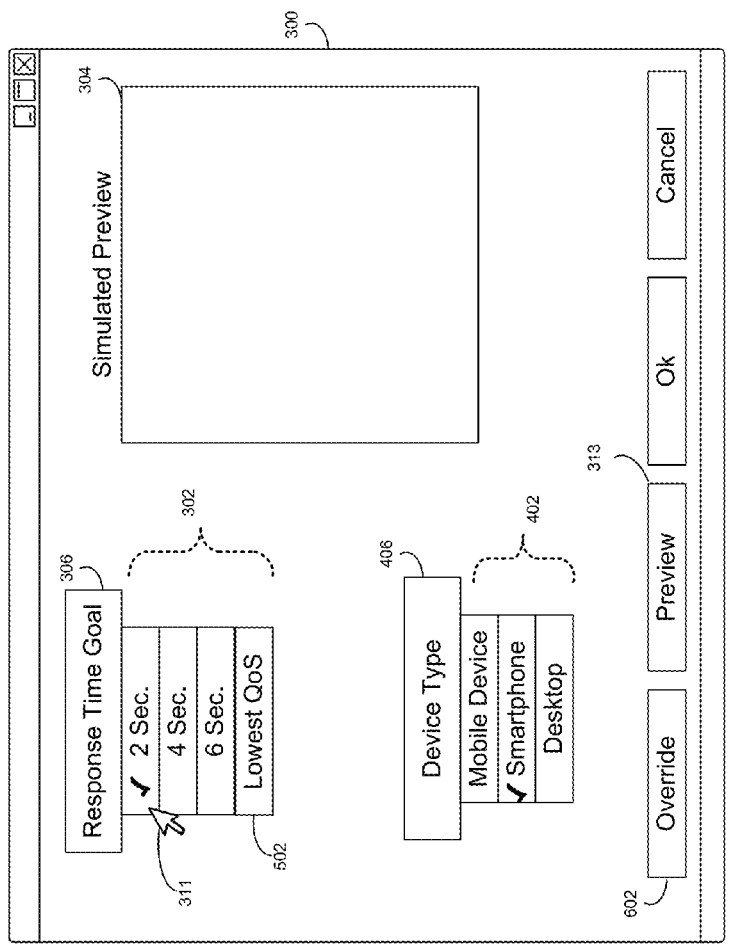
FIG. 6 is an illustrative diagrammatic view of a screen image displayed by the QoS selection process of FIG. 1.
Figure 7:
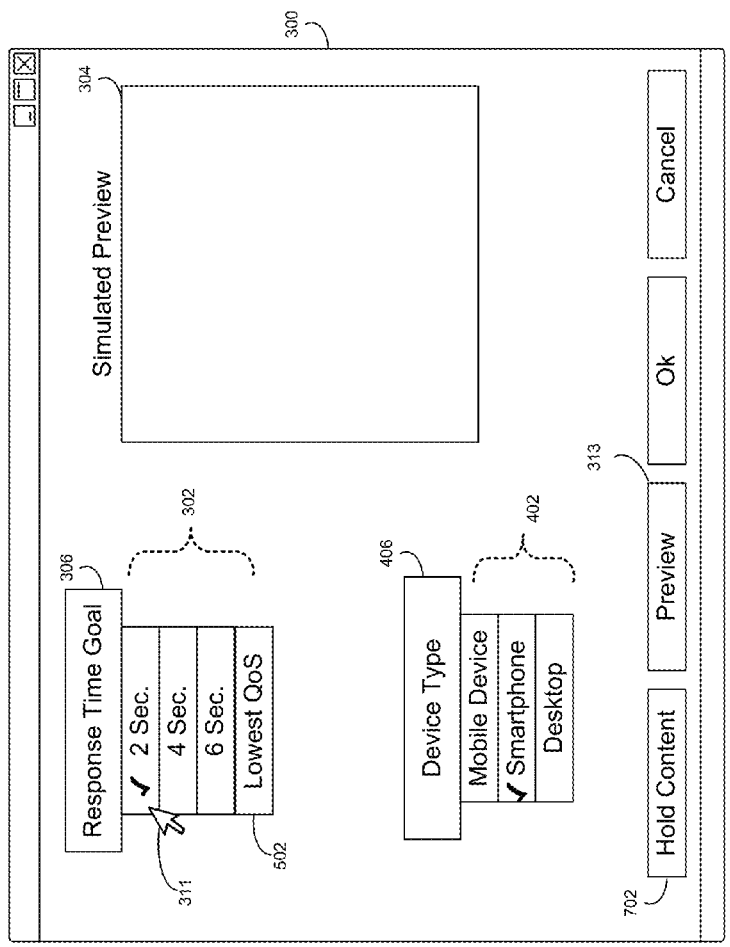
FIG. 7 is an illustrative diagrammatic view of a screen image displayed by the QoS selection process of FIG. 1.
Figure 8:
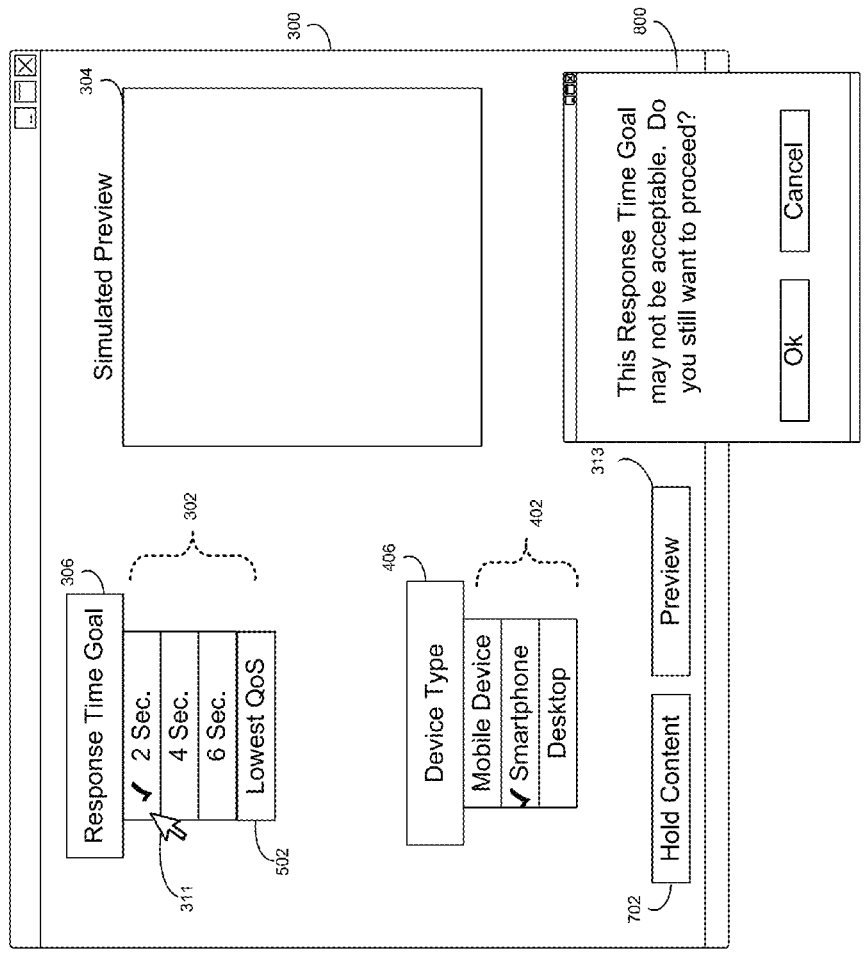
FIG. 8 is an illustrative diagrammatic view of a screen image displayed by the QoS selection process of FIG. 1.

System Overview:

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or combinations thereof.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring to FIG. 1, there is shown QoS selection process 10 that may reside on and may be executed by computer 12, which may be connected to network 14 (e.g., the internet or a local area network). Examples of client computer 12 may include, but are not limited to, a personal computer(s), a laptop computer(s), mobile computing device(s), a server computer, a series of server computers, a mainframe computer(s), or a computing cloud(s). Client computer 12 may execute an operating system, for example, but not limited to Microsoft® Windows®; Mac® OS X®; Red Hat® Linux®, or a custom operating system, for example. (Microsoft and Windows are registered trademarks of Microsoft Corporation in the United States, other countries or both; Mac and OS X registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, QoS selection process 10 may receive, at a remote computer device, a response time goal selected by an end user. The response time goal may include an interval when a next payload is to be received at a local computer device from the remote computer device. The remote computer device, e.g., via QoS selection process 10, may dynamically adjust content of the next payload to be delivered to the local computer device based on the response time goal selected by the end user to allow the content of the next payload to be received at the local computer device within the response time goal selected by the end user.

The instruction sets and subroutines of QoS selection process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may execute a meeting application (e.g., collaboration application 20), examples of which may include, but are not limited to, e.g., a web conferencing application, a video conferencing application, a voice-over-IP application, or other application that allows for virtual meeting and/or remote collaboration. QoS selection process 10 and/or collaboration application 20 may be accessed via client applications 22, 24, 26, 28. QoS selection process 10 may be a stand alone application, or may be an applet/application/script/module that may interact with and/or be executed within collaboration application 20. Examples of client applications 22, 24, 26, 28 may include but are not limited to a web conferencing application, video conferencing application, voice-over-IP application, or other application that allow for virtual meeting and/or remote collaboration (e.g., such as collaboration application 20), standard and/or mobile web browser, email client application, a customized web browser, or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, notebook computer 44, a tablet (not shown), a server (not shown), a data-enabled, cellular telephone (not shown), a television (not shown) with one or more processors embedded therein or coupled thereto, and a dedicated network device (not shown).

One or more of client applications 22, 24, 26, 28 may be configured to effectuate some or all of the functionality of QoS selection process 10 and/or collaboration application 20 and/or may include at least some of QoS selection process 10 and/or collaboration application 20. Accordingly, QoS selection process 10 and/or collaboration application 20 may be a purely server-side application, a purely client-side application, or a hybrid server-side/client-side application that is cooperatively executed by one or more of client applications 22, 24, 26, 28, QoS selection process 10, and collaboration application 20.

Users 46, 48, 50, 52 may access computer 12 and QoS selection process 10 directly through network 14 or through secondary network 18. Further, computer 12 may be connected to network 14 through secondary network 18, as illustrated with phantom link line 54. QoS selection process 10 may include one or more user interfaces, such as browsers and textual or graphical user interfaces, through which users 46, 48, 50, 52 may access QoS selection process 10.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between laptop computer 40 and WAP 58. Smart phone 42 is shown wirelessly coupled to network 14 via wireless communication channel 60 established between smart phone 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth™ is a telecommunications industry specification that allows, e.g., mobile phones, computers, smart phones, and other electronic devices to be interconnected using a short-range wireless connection.

Client electronic devices 38, 40, 42, 44 may each execute an operating system, examples of which may include but are not limited to Android™, Apple iOS™, Microsoft Windows™, Redhat Linux™, or a custom operating system.

The QoS Selection Process:

As discussed above and referring also to FIGS. 2-8, QoS selection process 10 may receive 200, at a remote computer device (e.g., computer 12), a response time goal (e.g., response time goal 302) selected by an end user (e.g., user 48). User 48, e.g., via QoS selection process 10, may select response time goal 302, e.g., through a user interface (e.g., user interface 300) on a local computer device (e.g., client electronic device 40). For example, user 48 may select a drop down menu (e.g., Response Time Goal Menu 306) using any appropriate medium (e.g., mouse pointer 311, touch screen, etc.). In the example, the drop down response time goal options are 2 seconds, 4 seconds, and 6 seconds. User 48 via Qos selection process 10 may also select Default option 317. Default may include, for example, conventional systems where computer 12 may select the response time goal for user 48, and where computer 12 generally cannot guarantee deterministic response time goals selected by computer 12. Those skilled in the art will appreciate that more or less response time goal options may be available to user 48. Furthermore, those skilled in the art will appreciate that other variations of user interface 300 may be made without departing from the scope of the disclosure.

The response time goal may include, for example, an interval when a next payload (e.g., payload 17) is to be received at client electronic device 40 from computer 12. For instance, assume for example purposes only that user 48 has selected a response time goal of 6 seconds. In the example, the user selected response time goal 302 may then be transmitted to computer 12. Further in the example, computer 12 may then send payload 17 to client electronic device 40 such that the content of payload 17 may be rendered and/or refreshed (e.g., page refreshed) by Qos selection process 10 via user interface 300 within 6 seconds from each respective previously received payload. The content of payload 17 may include, e.g., slides, text documents, videos, audio, graphics, drawings, shared whiteboards, or other data. According to one or more embodiments, the response time goal may include, for example, an interval when payload 17 is to be received at client electronic device 40 from one or more other clients (e.g., client electronic device 44). As such, the description of client electronic device 40 receiving payload 17 from computer 12, client electronic device 44, or combinations thereof, should be taken as an example only and not to otherwise limit the scope of the disclosure.

Additionally/alternatively, the 6 second response time may be the interval when payload 17 is to be delivered to client electronic device 40 before the content of payload 17 is rendered and/or refreshed by QoS selection process 10 via user interface 300. As such, the particular example of the response time goal including a rendering and/or refresh operation should be taken as an example only and not to otherwise limit the scope of the disclosure.

To allow the content of payload 17 to be delivered to client electronic device 40 within the response time goal selected by user 48, computer 12, e.g., via QoS selection process 10, may dynamically adjust 202 the content of payload 17 based at least in part on the response time goal selected by user 48. For example, adjusting 202 the content of payload 17 may include adjusting 204 quality of the content. For instance, assume for example purposes only that user 48 has selected a response time goal of 2 seconds. Further assume in the example that user 48 currently has a connection with a 10 MS latency and a 256K pipe. Further assume that due to, e.g., the current size of the content of payload 17, as well as current network conditions, computer 12 could send the content of payload 17 in its entirety to client electronic device 40 within a 4 second response time goal, but could not within the 2 second response time goal selected by user 48.

In the example, to allow the content of payload 17 to be delivered to client electronic device 40 within the 2 second response time goal selected by user 48, computer device 12 via QoS selection process 10 may downgrade the content of payload 17, e.g., from high-resolution to medium-resolution or low-resolution quality, so as to achieve the user selected 2 second response time. For content that includes compressed images/snapshots of a page/pieces of a page, computer device 12 via QoS selection process 10 may decide the quality of such content to be transmitted (e.g., color, black and white, 16 Bit, 32 Bit, 64 Bit, etc.).

Additionally/alternatively, adjusting 202 the content of payload 17 may include QoS selection process 10 filtering 206 the content of payload 17. For instance, assume for example purposes only that due to, e.g., the current size of the content of payload 17 in its entirety as well as current network conditions, computer 12 could not send the content of payload 17 to client electronic device 40 within the 2 second user selected response time goal. In the example, to allow the content of payload 17 to be delivered to client electronic device 40 within the 2 second response time goal selected by user 48, computer 12 via QoS selection process 10 may filter 206 (e.g., remove, reformat, etc.) information (e.g., advertising images, less relevant images, banners, text, etc.) from the content of payload 17, thereby allowing QoS selection process 10 to send the smaller sized filtered content of payload 17 to client electronic device 40 within the user selected 2 second response time goal.

Additionally/alternatively, client electronic device 40 via QoS selection process 10 may, after initially receiving the adjusted 202 content of payload 17, further receive the entirety of the content of payload 17, or at least a less adjusted 202 richer version of the content of payload 17. The richer version may be cached on client electronic device 40 for immediate or later review.

According to one or more embodiments, user 48 may via QoS selection process 10 select the response time goal in real time. For example, user 48 may be experiencing a 6 second response time and may later decide to change to a 2 second response time during a particular session, and accept the associated adjustment 202 in the quality of the content of payload 17.

Additionally/alternatively, one or more QoS characteristics of client electronic device 40 may be polled 212 by QoS selection process 10 to determine the adjustment 202 of the content of payload 17 necessary to achieve response time goal 302 selected by user 48. For example, QoS selection process 10 may continuously and/or discretely poll 212 the QoS characteristics, e.g., of client electronic device 40, such that if the current network conditions change (e.g., bandwidth decreases, latency decreases, bandwidth improves, latency improves, etc.) then QoS selection process 10 may adjust 202 the content of payload 17 accordingly to achieve response time goal 302 selected by user 48. Thus, in the example where bandwidth and/or latency improve, adjusting 204 the content of payload 17 may include increasing the quality of the content of payload 17, e.g., if such an increase will still achieve response time goal 302 selected by user 48. Similarly, adjusting 206 the content of payload 17 may include filtering 206 less of the content from payload 17, or not filtering 206 the content from payload 17 at all, e.g., if such a decreased filtering will still achieve response time goal 302 selected by user 48. This may allow QoS selection process 10 to provide differential streaming based on real time adjustments.

Additionally/alternatively, if the appropriate resources are available, additional bandwidth may be allocated to user 48 to achieve response time goal 302 selected by user 48, with or without adjusting 202 the content of payload 17. As such, any combination of adjusting 202 the content of payload 17 and/ or network resources and/or other techniques may be available to QoS selection process 10 to achieve response time goal 302 selected by user 48.

Additionally/alternatively, one or more QoS characteristics of client electronic device 40 used by QoS selection process 10 to determine the adjustment 202 of the content of payload 17 necessary to achieve response time goal 302 selected by user 48 may include, for example, the type of network (e.g., cellular, 3G, low speed broadband, high speed broadband, LAN/WAN, etc.), the hardware (e.g., processor, memory, etc.) of client electronic device 40 as well as the type of computer device (e.g., personal computer, laptop computer, smart phone, notebook computer, tablet, etc.). This information may be obtained by QoS selection process 10, e.g., via computer 12 and/or client electronic device 40 during an initial handshake between client electronic device 40 and computer 12 at the beginning of a session (e.g., eMeeting session). QoS selection process 10 may include, for example, a policy management process that specifies default expectations for the particular type of computer device (e.g., 10 second delivery to smart phones, 5 second delivery to tablets, 3 second delivery to browsers, etc.), hardware, network type, or combinations thereof.

Additionally/alternatively, a preview of the content of payload 17 may be simulated 214, e.g., via QoS selection process 10, based on response time goal 302 selected by user 48. This may be simulated 214 automatically after selecting the response time goal is selected, or may be simulated 214 by QoS selection process 10 enabling user 48 to select preview option 313. For example, before QoS selection process 10 affirmatively adjusts 202 the content of payload 17 to correspond to the response time goal selected by user 48, a window (e.g., Simulated Preview Window 304) may be displayed via QoS selection process 10 showing how the adjusted 202 content of payload 17 will be rendered assuming response time goal 302 selected by user 48 is affirmatively implemented. Simulated Preview Window 304 may be, for example, within user interface 300, or may be opened in a separate window (not shown). The previewed content displayed in Simulated Preview Window 304 may be an estimation generated by QoS selection process 10 showing how the content of payload 17 may likely be rendered, an actual sample of the adjusted 202 content of payload 17 at the selected response time goal, or a pre-generated generic image and/or video unrelated to the actual content of payload 17.

According to one or more example embodiments, a host and/or presenter (e.g., user 48), may choose to simulate 214 an eMeeting via QoS selection process 10 with a QoS (e.g., response time goal) equal to the lowest QoS 502 experienced by the remaining attendees (e.g., users 46, 50, 52). This may allow, e.g., user 48, to better guide the verbal communication to match the receiving capabilities of the attendees. This may be accomplished with Simulated Preview Window 304 within user interface 300, or may be opened in a separate window (not shown), or may replace the current rendering of user 48 altogether as if user 48 had selected a particular response time goal to achieve the lowest QoS service. Additionally/alternatively, QoS selection process 10 may enable user 48 to select preview option 313 to experience each attendees' user selected response time goal.

According to one or more example embodiments, a host and/or presenter (e.g., user 48), may select and/or toggle between one or more lists of current delivery settings (e.g., which may include response time goal 302 via Response Time Goal menu 306, user device type 402 via Device Type drop down menu 406, etc.), such that user 48 may simulate 214 via QoS selection process 10 the experience of, e.g., a smart phone, and then toggle to simulate 214 the experience of a mobile device (e.g., laptop).

Additionally/alternatively, adjusting 202 the content of payload 17 via QoS selection process 10 may include adjusting 208 the content of payload 17 to be delivered to a plurality of local computer devices (e.g., client electronic devices 38, 40, 42, 44) based on response time goal 302 selected by user 48. For instance, assume for example purposes only that users 46, 48, 50, 52 are participants in an eMeeting. Further assume that user 48 has selected a response time goal 302 of 2 seconds, user 50 has selected a response time goal 302 of 4 seconds, and user 52 has selected a response time goal 302 of 6 seconds. QoS selection process 10 may enable user 48 to select override option 602 in user interface 300 to override the individual response time goals of users 46, 50, and 52, such that each of users 46, 48, 50, 52 share the same response time goal.

As another example, rather than actually overriding the individual response time goals of each user, QoS selection process 10 may enable user 48 to select hold content option 702 in user interface 300 to hold the content of payload 17 at any point at and/or between computer 12 and client electronic devices 38, 40, 42, 44, and then provide the held content to each of users 46, 48, 50, and 52 simultaneously (or near simultaneously). While slowing the delivery to some, this may give the appearance of having each of users 46, 48, 50, 52 share the same response time goal.

Additionally/alternatively, adjusting 202 the content of payload 17 via QoS selection process 10 may include adjusting 210 the content of payload 17 to be delivered to a plurality of local computer devices (e.g., client electronic devices 38, 40, 42, 44), wherein at least one response time goal of a second user (e.g., user 50) of the plurality of local computer devices may be different than the response time goal selected by user 48. For instance, assume for example purposes only that users 46, 48, 50, 52 are participants in an eMeeting. Each of users 46, 48, 50, 52 may have selected differing response time goals, e.g., users 46 and 48 may have selected a response time goal 302 of 2 seconds, user 50 may have selected a response time goal 302 of 4 seconds, and user 52 may have selected a response time goal 302 of 6 seconds. According to at least one embodiment, this may be accomplished using and/or sharing different and/or alternate streams for each respective user(s). For example, each user 49 and 48 with a selected response time goal of 2 seconds may use and/or share one stream, user 50 with a selected response time goal of 4 seconds may use and/or share another stream, and user 52 with a selected response time goal of 6 seconds may use and/or share yet another stream.

As another example, according to one or more embodiments, each user's QoS may be tied to employee ranking. For instance, if user 48 has a higher employee stature than user 50, then user 48 via QoS selection process 10 may be guaranteed higher quality receipt (e.g., via the shortest response time goal). As another example, an eMeeting consisting of higher stature employees may cause QoS selection process 10 to reserve higher overall bandwidth requirements for the higher stature employees before lower stature employees.

Additionally/alternatively, QoS selection process 10 may implement an eMeeting feedback loop, where following an eMeeting, transmission characters of user 48 may be known and associated with an input survey completed by user 48 that describes the eMeeting experience of user 48. Such information may be used by QoS selection process 10 to develop an individual and/or general profile of QoS acceptability levels going forward, not only to user 48 but may also apply to other users. For example, if user 48 has already noted in the survey that a 2 second response time goal would not provide user 48 with a satisfactory experience, QoS selection process 10 may, for example, suggest via pop-up window 800 that a 2 second response time has already been acknowledged by user 48 to be unsatisfactory. User 48 may then have the option whether or not to proceed to selecting the 2 second response time goal via QoS selection process 10. As another example, if user 50 later decides to select a 2 second response time goal, because user 48 has already noted in the survey that a 2 second response time goal would not provide a satisfactory experience, QoS selection process 10 may, for example, suggest via pop-up window 800 to user 50 that a 2 second response time may not provide a satisfactory experience. User 50 may then have the option whether or not to proceed to selecting the 2 second response time goal via QoS selection process 10.

Those skilled in the art will appreciate that a best effort approach by QoS selection process 10 to satisfy the user selected response time is contemplated. This may include, for example, leveraging one or more known bandwidth, compression, resolution management, etc. optimization techniques. However, the user selected response time need not be exact and may include, for example, slightly more or less time (e.g., ±0.1 seconds).

While one or more embodiments are described in terms of an eMeeting, those skilled in the art will recognize that Applications other than eMeetings may also be used without departing from the scope of the disclosure. Accordingly, the use of an eMeeting should be taken as an example only and not to otherwise limit the scope of the disclosure.

While one or more embodiments are described in terms of parallel content in a session that includes audio and/or video, those skilled in the art will recognize that other parallel content (e.g., parallel streaming of other audio/video content that may or may not be part of that session, downloading of files/content/media alongside an already active session that may or may not be part of that session, etc.) may also be included. For instance, assume for example purposes only that user 48 (i.e., client electronic device 40) and user 52 (i.e., client electronic device 44) are in an eMeeting in which user 48 via client electronic device 40 has, e.g., 3 portlets that are streaming a first news website, a second news website, and a third news website. In the example, user 48 via QoS selection process 10 may adjust 202 the QOS characteristics of the audio to "max", adjust 202 the QoS characteristics of the video to a 1-second response update, and adjust 202 the QOS characteristics of the other media to behave in a way that satisfied the latter priorities first.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The embodiment(s) were chosen and described in order to best explain the principles of the disclosure and the practical application, and to enable others of ordinary skill in the art to understand the disclosure for various embodiment(s) with various modifications and/or any combinations of embodiment(s) as are suited to the particular use contemplated.

Having thus described the disclosure of the present application in detail and by reference to embodiment(s) thereof, it will be apparent that modifications, variations, and any combinations of embodiment(s) (including any modifications, variations, and combinations thereof) are possible without departing from the scope of the disclosure defined in the appended claims.

What is claimed is:

1. A computer-implemented method comprising:
   receiving, at a remote computer device, a response time goal selected by an end user, wherein the response time goal includes an interval of time when a next payload is to be received and rendered at a local computer device from the remote computer device, wherein the interval of time is selected by the end user when selecting the response time goal; and
   adjusting dynamically, by the remote computer device, content of the next payload to be delivered to the local computer device based on the response time goal selected by the end user to allow the content of the next payload to be received and rendered at the local computer device within the response time goal selected by the end user.

2. The computer-implemented method of claim 1 wherein adjusting the content of the next payload includes adjusting quality of the content.

3. The computer-implemented method of claim 1 wherein adjusting the content of the next payload includes filtering the content of the next payload.

4. The computer-implemented method of claim 1 further comprising polling one or more QoS characteristics of the local computer device to determine the adjustment of the content of the next payload to achieve the response time goal selected by the end user.

5. The computer-implemented method of claim 1 wherein adjusting the content of the next payload includes adjusting the content of the next payload to be delivered to a plurality of local computer devices based on the response time goal selected by the end user.

6. The computer-implemented method of claim 1 wherein adjusting the content of the next payload includes adjusting the content of the next payload to be delivered to a plurality of local computer devices, wherein at least one response time goal of a second end user of the plurality of local computer devices is different than the response time goal selected by the end user.

7. The computer-implemented method of claim 1 further comprising simulating a preview of the content of the next payload based on the response time goal selected by the end user.

8. A computer program product residing on a non-transitory computer readable storage medium having a plurality of instructions stored thereon which, when executed by a processor, cause the processor to perform operations comprising:
   receiving, at a remote computer device, a response time goal selected by an end user, wherein the response time goal includes an interval of time when a next payload is to be received and rendered at a local computer device from the remote computer device, wherein the interval of time is selected by the end user when selecting the response time goal; and
   adjusting dynamically, by the remote computer device, content of the next payload to be delivered to the local computer device based on the response time goal selected by the end user to allow the content of the next payload to be received and rendered at the local computer device within the response time goal selected by the end user.

9. The computer program product of claim 8 wherein adjusting the content of the next payload includes adjusting quality of the content.

10. The computer program product of claim 8 wherein adjusting the content of the next payload includes filtering the content of the next payload.

11. The computer program product of claim 8 wherein the operations further comprise polling one or more QoS characteristics of the local computer device to determine the adjustment of the content of the next payload to achieve the response time goal selected by the end user.

12. The computer program product of claim 8 wherein adjusting the content of the next payload includes adjusting the content of the next payload to be delivered to a plurality of local computer devices based on the response time goal selected by the end user.

13. The computer program product of claim 8 wherein adjusting the content of the next payload includes adjusting the content of the next payload to be delivered to a plurality of local computer devices, wherein at least one response time goal of a second end user of the plurality of local computer devices is different than the response time goal selected by the end user.

14. The computer program product of claim 8 wherein the operations further comprise simulating a preview of the content of the next payload based on the response time goal selected by the end user.

15. A computing system including a processor and memory configured to perform operations comprising:
   receiving, at a remote computer device, a response time goal selected by an end user, wherein the response time goal includes an interval of time when a next payload is to be received and rendered at a local computer device from the remote computer device, wherein the interval of time is selected by the end user when selecting the response time goal; and
   adjusting dynamically, by the remote computer device, content of the next payload to be delivered to the local computer device based on the response time goal selected by the end user to allow the content of the next payload to be received and rendered at the local computer device within the response time goal selected by the end user.

16. The computing system of claim 15 wherein adjusting the content of the next payload includes adjusting quality of the content.

17. The computing system of claim 15 wherein adjusting the content of the next payload includes filtering the content of the next payload.

18. The computing system of claim 15 wherein the operations further comprise polling one or more QoS characteristics of the local computer device to determine the adjustment of the content of the next payload to achieve the response time goal selected by the end user.

19. The computing system of claim 15 wherein adjusting the content of the next payload includes adjusting the content of the next payload to be delivered to a plurality of local computer devices based on the response time goal selected by the end user.

20. The computing system of claim 15 wherein adjusting the content of the next payload includes adjusting the content of the next payload to be delivered to a plurality of local computer devices, wherein at least one response time goal of a second end user of the plurality of local computer devices is different than the response time goal selected by the end user.

21. The computing system of claim 15 wherein the operations further comprise simulating a preview of the content of the next payload based on the response time goal selected by the end user.

* * * * *